United States Patent [19]
Leivian et al.

[11] Patent Number: 5,097,141
[45] Date of Patent: Mar. 17, 1992

[54] SIMPLE DISTANCE NEURON

[75] Inventors: Robert H. Leivian, Chandler; William M. Peterson, Scottsdale; Robert M. Gardner, Mesa; Sidney C. Garrison, III, Tempe, all of Ariz.

[73] Assignee: Motorola, Inc., Schaumburg, Ill.

[21] Appl. No.: 626,653

[22] Filed: Dec. 12, 1990

[51] Int. Cl.⁵ .............................................. G06F 15/42
[52] U.S. Cl. ..................................... 307/201; 364/807
[58] Field of Search ................ 307/201; 364/513, 807; 395/23-24

[56] References Cited

U.S. PATENT DOCUMENTS

| | | | |
|---|---|---|---|
| 4,518,866 | 5/1985 | Clymer | 307/201 |
| 4,901,271 | 2/1990 | Graf | 364/807 |
| 4,916,635 | 4/1990 | Singer et al. | 364/513 |
| 4,926,064 | 5/1990 | Tapang | 307/201 |
| 4,972,187 | 11/1990 | Wecker | 364/513 X |
| 4,972,363 | 11/1990 | Nguyen et al. | 307/201 X |
| 5,004,932 | 4/1991 | Nejime | 307/201 |
| 5,021,988 | 6/1991 | Mashiko | 364/807 |

Primary Examiner—David Hudspeth
Attorney, Agent, or Firm—Robert D. Atkins; Michael D. Bingham

[57] ABSTRACT

An artificial neuron is provided using a simple distance calculation between the input signal vector and the synapse weight signals for providing an output signal. A difference signal is developed by subtracting a weight signal from an input signal. The difference signal is processed through a weighting function having a predetermined polarity and accumulated for providing the output signal of the neuron. A digital embodiment is supported with a memory circuit for storing the digital weights and a memory lookup table or possibly a multiplexer circuit for weighting of the difference signal. An analog embodiment uses a plurality of comparators responsive to the input signal vector and the weight signals for providing the output signal of the neuron as the absolute value of the difference of the input signal vectors and the weight signals.

20 Claims, 5 Drawing Sheets

FIG. 1

-PRIOR ART-

SIMPLE DISTANCE NEURON

FIELD OF THE INVENTION

The present invention relates to an artificial neuron using a simple distance calculation between the input signal vector and the synapse weight elements for providing an output signal.

BACKGROUND OF THE INVENTION

A biological neuron is a single nerve cell responsive to stimuli through weighted inputs known as synapses. The weighted stimuli are summed and processed through a particular nonlinearity (sigmoid) associated with the neuron. The output of the neuron may be coupled to the synapses of other neurons forming an interconnection known as a neural network which possesses many desirable properties including the ability to learn and recognize information patterns in a parallel manner.

One conventional technique for processing the input signal vector through an artificial neuron involves forming a dot product combination between the elements of the input signal vector and the weight elements associated with the synapses. The dot product computation typically utilizes a plurality of multipliers coupled one each for receiving an element of the input signal vector and an element of the weight vector. The output signals of the plurality of multipliers are summed and processed through the sigmoid for providing the output signal of the neuron. A more detailed explanation of the dot product operation of conventional neurons is described in the detailed description of the prior art section.

One of the shortcomings of the aforedescribed neuron is the requirement for multiplier circuits which perform the dot product between the input signal vector and the weight vector. In analog form, multiplier circuits tend to be limited in accuracy and sensitive to process variation during manufacturing and temperature variation during operation. On the other hand, four quadrant digital multipliers are often large and complex taking significant portions of the available integrated circuit area, especially for neurons processing large input signal vectors since each element of the input signal vector is typically matched with a dedicated multiplier. Hence, it is desirable to remove multiplier circuits from neural networks as much as possible.

The nonlinear sigmoid function is provided for limiting the magnitude of the output signal should the sum of the products of the input signal vector and the weight elements become excessively large. While it is possible to limit the magnitude of the output signal by normalizing the input signal vector (dividing each element by a predetermined constant), a sigmoid function positioned at the output of the neuron has proven to be a simpler solution. Yet, it is still desirable to eliminate the sigmoid function to simplify the design and reduce the physical size of the neuron thereby allowing more neurons per unit area on the integrated circuit.

Hence, there is a need for an improved artificial neuron for processing an input signal vector through the synapse weight elements without the use of multiplier circuits for performing the dot product combination thereof and further without the sigmoid function for limiting the magnitude of the output signal of the neuron.

SUMMARY OF THE INVENTION

Briefly stated, the invention comprises an artificial neuron including a first circuit for subtracting a weight element from an input signal and providing a difference signal, and a second circuit for processing the difference signal through a weighting function of the first circuit for providing an output signal having a predetermined polarity, while a third circuit accumulates the output signal of the second circuit.

In another aspect the present invention is a neural network comprising a digital processing element including a first digital input bus coupled for receiving a digital input signal and a digital address bus coupled for receiving a digital address signal. A first circuit stores a plurality of digital weight elements and provides one of the plurality of digital weight elements at an output port according to the digital address signal. A second circuit is coupled for receiving the digital input signal and one of the plurality of digital weight elements for providing a difference signal as the difference of the digital input signal and one of the plurality of digital weight elements. A third circuit receives the difference signal and applies a weighting function to the difference signal for providing an output signal having a predetermined polarity, and a fourth circuit receives the output signal of the third circuit and accumulating the value thereof.

One of the advantages of the present invention is the combination of the input signal vector and the synapse weight elements with a simple distance calculation for providing the output signal of the neuron without the use of multiplier circuits and nonlinear sigmoid functions. A difference signal is developed by subtracting a weight element from an input signal. The difference signal is processed through a weighting function having a predetermined polarity and accumulated for providing the output signal of the neuron.

DETAILED DESCRIPTION OF THE PRIOR ART

Figure 1:
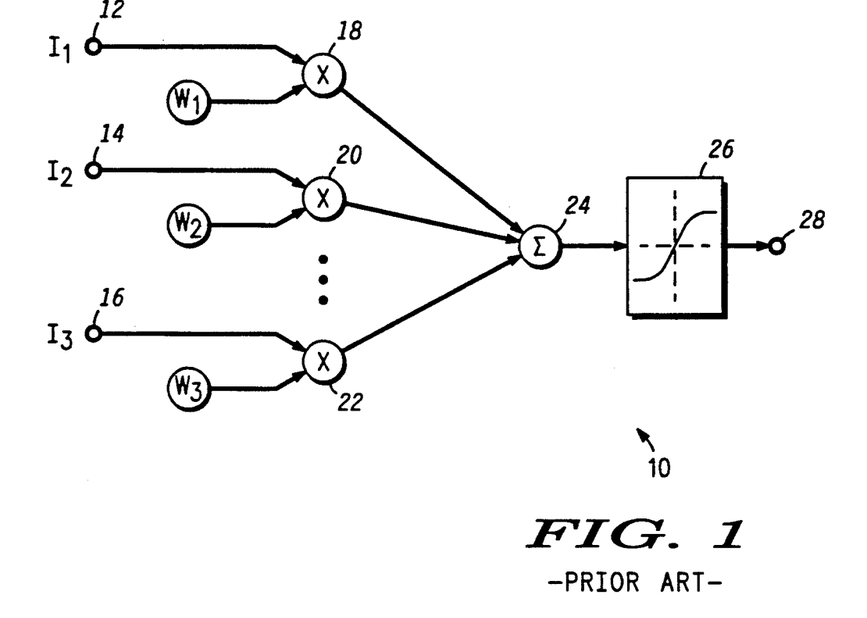
FIG. 1 is an illustration of a conventional neuron.

In FIG. 1 there is shown neuron 10 as a conventional element of a modern neural network. An input signal vector comprising elements $I_1$, $I_2$ and $I_3$ is applied at inputs 12, 14 and 16 at the first inputs of four quadrant multipliers 18, 20 and 22, respectively. The second inputs of multipliers 18, 20 and 22 are coupled for receiving weight elements $W_1$, $W_2$ and $W_3$, while the output signals of multipliers 18, 20 and 22 are summed through summing junction 24 and processed through sigmoid function 26 ($\sigma(\ )$) for providing output signal $S_{28}$ of neuron 10 at output 28. The sigmoid function limits the magnitude of output signal $S_{28}$ with increasing signal levels from summing junction 24. The operation of neuron 10 may be described mathematically as a dot product combination of the input signal vector $I_1$-$I_3$ and the weight elements $W_1$-$W_3$ as follows:

$$S_{28} = \sigma(I \cdot W) \quad (1)$$

$$S_{28} = \sigma(I_1 \times W_1 + I_2 \times W_2 + I_3 \times W_3) \quad (2)$$

$$S_{28} = \sigma(|I| |W| \cos(\beta)) \quad (3)$$

From Equation (1), output signal $S_{28}$ is the dot product of the input signal vector I and the weight vector W processed through the sigmoid function. The same relationship is expanded in Equation (2) with the elements of the input signal vector $I_1$-$I_3$ and the weight vector $W_1$-$W_3$. A theorem from vector calculus shows that Equation (3) holds in that the output signal $S_{28}$ is the product of the magnitude of the input signal vector I and the magnitude of the weight vector W times the cosine of the angle between the vectors processed through the sigmoid function. With the magnitude of vectors I and W normalized, the output signal $S_{28}$ is a function of the angle $\beta$ between the vectors I and W and thus is a measure of their similarity.

Multiplier circuits 18, 20 and 22 are required for the dot product combination, i.e., $I_1 \times W_1 + I_2 \times W_2 + I_3 \times W_3$. It is desirable for improving accuracy and reducing complexity and physical area to eliminate multiplier circuits 18-22 from the operation of neuron 10, especially for large input signal vectors. Furthermore, the dot product operation of neuron 10 requires either a normalization of the input signal vector $I_1$-$I_3$ (not shown), or as is more common, a limitation on the output signal of summing junction 24 as provided by nonlinear sigmoid function 26 which clips the magnitude of the output signal should one or more elements of the input signal vector times the associated weight become excessively large. Neural networks often contain hundreds or even thousands of neurons for performing a useful function. Thus, by eliminating multipliers 18-22 and sigmoid function 26 and thereby reducing the complexity and area of the individual neuron, more neurons may be allocated per unit area. Accordingly, it is desirable to provid a neuron operating without multipliers like 18-22 and a nonlinear sigmoid function like 26.

DETAILED DESCRIPTION OF THE PREFERRED EMBODIMENT

Figure 2:
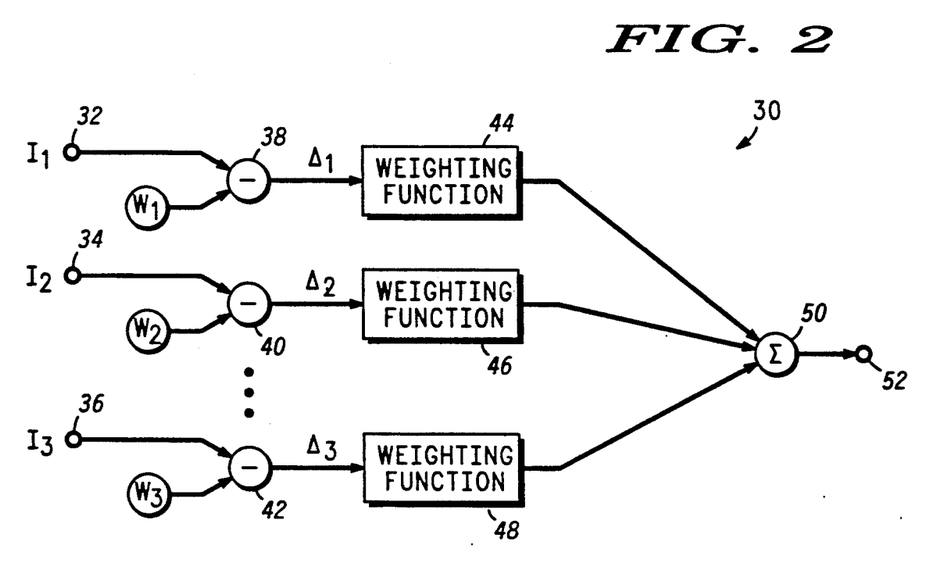
FIG. 2 is a simplified block diagram illustrating the function of the present invention.

Referring to FIG. 2, there is shown a functional block diagram of the present invention as neuron 30. An input signal vector $I_1$, $I_2$ and $I_3$ is applied through inputs 32, 34 and 36 to the first inputs of subtracter circuits 38, 40 and 42. The second inputs of subtracter circuits 38, 40 and 42 are coupled for receiving weight elements $W_1$, $W_2$ and $W_3$, respectively. The difference between elements $I_1$, $I_2$ and $I_3$ of the input signal vector and the corresponding weight elements $W_1$, $W_2$ and $W_3$ are processed through weighting functions 44, 46 and 48, respectively, and summed through summing junction 50 for providing an output signal $V_{52}$ at output 52. The difference signal $\Delta_1$ provided at the output of subtracter circuit 38 is equal to $I_1-W_1$, while the difference signal $\Delta_2$ at the output of subtracter circuit 40 is $I_2-W_2$, and the difference signal $\Delta_3$ of subtracter circuit 42 is $I_3-W_3$. Thus, output signal $V_{52}$ may be mathematically described as:

$$V_{52} = F_{44}(I_1-W_1) + F_{46}(I_2-W_2) + F_{48}(I_3-W_3) \quad (4)$$

where:
$F_{44}(\ )$ is weighting function 44
$F_{46}(\ )$ is weighting function 46
$F_{48}(\ )$ is weighting function 48

Figure 3:
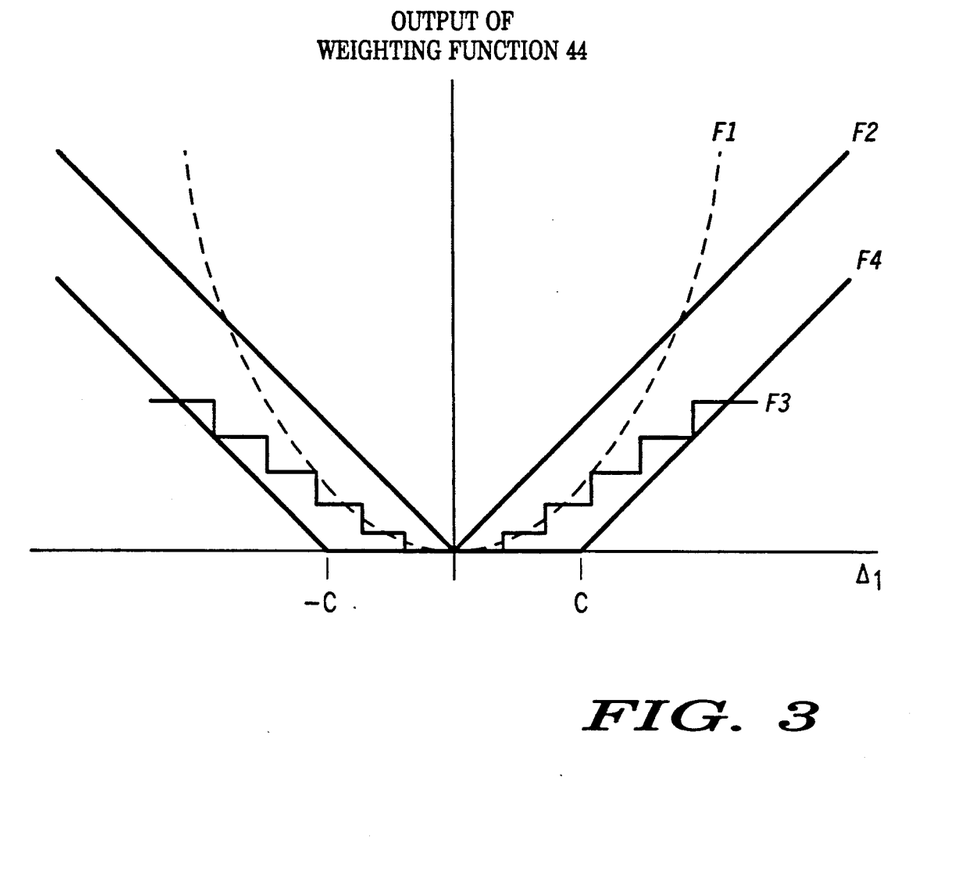
FIG. 3 is a graph of the weighting functions useful in the explanation of the present invention.

Weighting function 44 is graphically illustrated in FIG. 3 as four separate embodiments. Weighting functions 46 and 48 typically follow the same pattern as weighting function 44. In one embodiment, function $F_1$ causes the square of the Euclidean distance to be computed by squaring the difference signal $\Delta_1$ provided at the output of subtracter circuit 38 ($F_1 = \Delta^2$). Function $F_2$ is simply the absolute value of the difference signal $\Delta_1$ ($F_2 = |\Delta|$), and function $F_3$ is the magnitude of the difference signal divided by an integer K ($F_3 = |\Delta|/K$), where K is typically a binary value in powers of two. Function $F_4$ is the maximum of zero and the magnitude of the difference signal minus a constant C ($F_4 = \text{Max}(|\Delta|-C,0)$), wherein the minimum value of the function is zero when the magnitude of the difference signal is less than C and increases in a linear positive direction as the difference signal exceeds the value of C as shown in FIG. 3.

Thus, the operation of weighting functions 44-48 provides a means of weighting the difference signals for statistical processing. Function $F_1$ weights the difference signal by a squaring operation whereby larger difference signals produce greater output signals in a nonlinear fashion while smaller difference signals have much less of an impact. Functions $F_2$ and $F_4$ provide similar linear weighting for the difference signal, although function $F_4$ requires a minimum value C of the difference signal before producing an output signal. When the input signal and the weight vector are very close, i.e. a small difference signal, the output signal $V_{52}$ of neuron 30 should be small. Function $F_3$ includes the advantages of minor contributions from low value difference signals while providing larger output signals of the weighting function in a stair-step manner as the difference signal increases.

The output signals of weighting functions 44, 46 and 48 are summed through summing junction 50 for providing the output signal $V_{52}$ of neuron 30 at output 52. The operation of neuron 30 determines how close the weight vector $W_1$-$W_3$ comes to matching the input signal vector $I_1$-$I_3$. Thus, instead of trying to calculate the angle $\beta$ between the input signal vector I and the weight vector W as is done for dot product combinations, the present invention simply calculates a distance between the end points of the input signal vector I and the weight vector W. The nonlinear sigmoid function is not needed since the magnitude of the output signal is inherently limited by the subtraction process. A highly correlated input vector and weight vector produces a small value whereas a dot product type neuron produces a large value, thus, as the input vector and weight vector become more highly correlated, the output signal of neuron 30 tends toward smaller values while the dot product neuron of the prior art tends toward larger values. This change in polarity must be accounted for in network design with neuron 30 as is understood.

Figure 4:
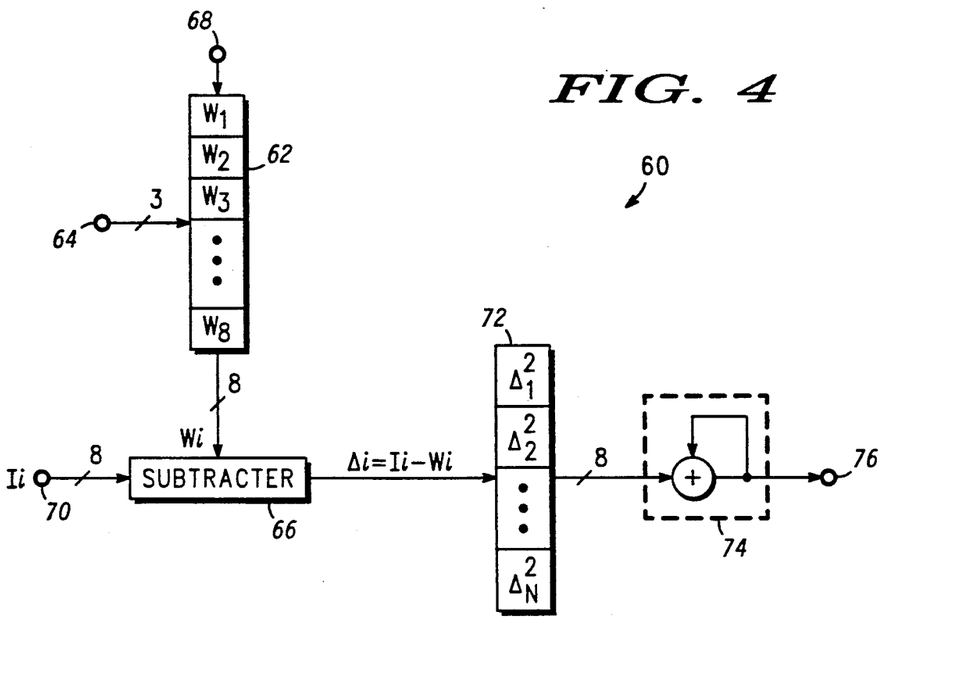
FIG. 4 is a simplified block diagram illustrating a digital embodiment of the present invention.

Referring to FIG. 4, there is shown a digital embodiment of the present invention as neuron 60 including weight memory 62 coupled for receiving a 3-bit address word $A_i$ applied at address bus 64 and providing an 8-bit digital weight value $W_i$ at the first input of subtracter circuit 66 in response to the address word $A_i$, where i ranges from 1 to 8. Weight memory 62 includes a predetermined number of 8-bit memory locations, $W_1$–$W_8$, and may be implemented as RAM, ROM, EPROM, EEPROM or any other suitable digital memory device. Weights $W_i$ are precalculated possibly from an external neural network computer simulation and written into weight memory 62 in a conventional manner through input bus 68. It is known that weight memory 62 can be divided into several logical areas allowing multiple sets of weights $W_i$ to be stored concurrently and accessed as needed with different input signal vectors. This allows physical neurons (excluding weight memory 62) to operate on several possibly distinct neural applications in a time multiplexed fashion thereby increasing the overall operational speed by avoiding excessive swapping of weight $W_i$ sets for combination with different input signal vectors.

Continuing with FIG. 4, the second input of subtracter 66 is coupled for receiving a digital input signal $I_i$ applied at input bus 70, whereby an 8-bit difference signal $\Delta_i = I_i - W_i$ is formed at the output of subtracter circuit 66 and applied as an address into lookup table 72 for performing any one of the weighting functions shown in FIG. 3. For example, squaring function $F_1$ is achieved by storing the algebraic square of the difference signal $\Delta_i$ in the memory locations of lookup table 72 according to the address value $\Delta_i$. The difference signal $\Delta_i$ may be treated as a fractional binary, i.e., "0010.0011", wherein values greater than "0001.000" become larger through the squaring function and values smaller than "0001.0000" become smaller when squared. If $\Delta_i =$ "0010.0000", then address "00100000" of lookup table 72 would contain the value "00000100.00000000". Alternately, If $\Delta_i =$ "0000.0011", then address "00000011" of lookup table 72 would contain the value "00000000.00001001". The size of the RAM is dependent upon the desired precision as is understood. For example, it is possible to discard lesser significant bits at the extremes of the binary point at the cost of precision. The technique of using a lookup table for processing a signal through an algebraic function, such as functions $F_1$–$F_4$ of FIG. 3, is well known in the art. Lookup table 72 may be implemented as RAM, ROM, EPROM, EEPROM or any other suitable digital memory device and sized as need for the application. The output signal of lookup table 72 is accumulated in accumulator 74 for providing the output signal of neuron 60 at output 76.

The digital embodiment of FIG. 4 performs a Euclidian distance calculation (function $F_1$) on the digital input signal series $I_1$–$I_8$ and weights $W_1$–$W_8$ yielding a 16-bit value $V_{76}$ in accumulator 74 as follows:

$$V_{76} = (I_1 - W_1)^2 + (I_2 - W_2)^2 \\ + (I_3 - W_3)^2 + (I_4 - W_4)^2 \\ + (I_5 - W_5)^2 \\ + (I_6 - W_6)^2 + (I_7 - W_7)^2 + (I_8 - W_8)^2 \quad (5)$$

For one computation series according to equation (5), accumulator 74 is zeroed after which a first 8-bit digital input signal, $I_1$, is applied at the second input of subtracter 66 via input bus 70, while an address word, $A_1$, is applied at the address input of weight memory 62 by way of address bus 64. The value of address word $A_1$ retrieves the 8-bit weight $W_1$ from weight memory 62 and applies the same to the first input of subtracter 66. The difference of digital input signal $I_1$ and weight $W_1$ ($\Delta_1 = I_1 - W_1$) becomes an address into lookup table 72 for performing a squaring operation thereon. The square of the difference signal $(\Delta_1)^2$ is stored in accumulator 74. A second digital input signal, $I_2$, is then applied at the second input of subtracter 66 while a second address word, $A_2$, retrieves weight $W_2$ and applies the 8-bit value thereof to the first input of subtracter 66. The difference signal $\Delta_2$ from the digital input signal $I_2$ and weight $W_2$ is also squared in lookup table 72 and summed with the prior contents of accumulator 74. The process continues for third, fourth, fifth, sixth, seventh and eighth combination of digital input signals $I_3$–$I_8$ and weights $W_3$–$W_8$ according to equation (5) leaving the 16-bit value $V_{76}$ in accumulator 74 as the output signal of neuron 60. Again, the weighting function stored in lookup table 72 may comprise any one of the functions $F_1$–$F_4$ disclosed in FIG. 3 and others. Furthermore, the invention supports practically any size input signal vector I and any number of weight elements W in weight memory 62.

Figure 5:
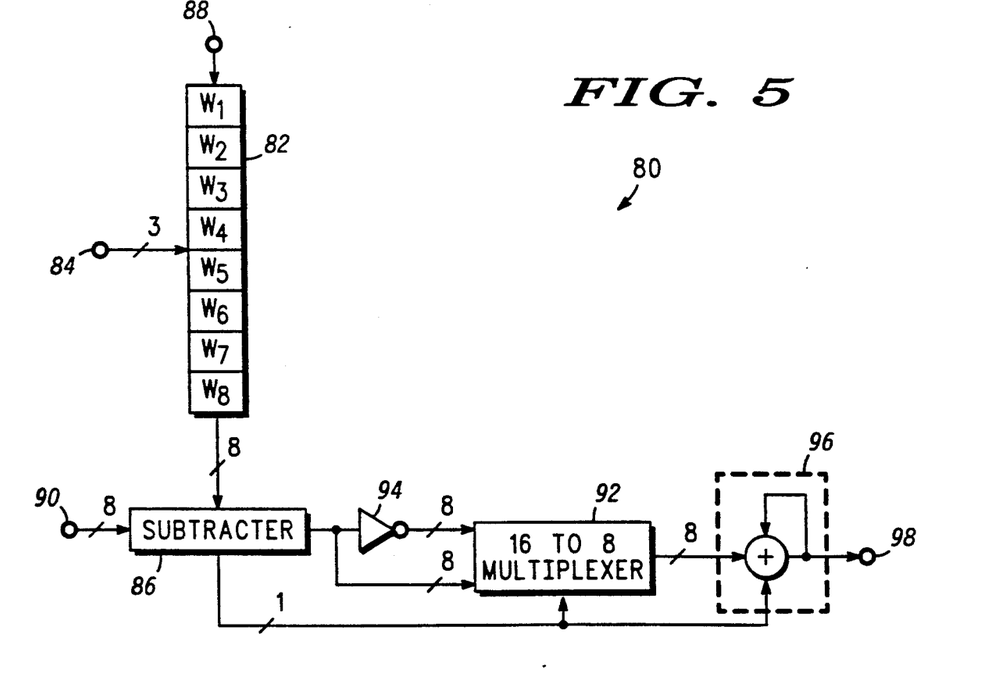
FIG. 5 is a simplified block diagram illustrating an alternate digital embodiment of the present invention.

An alternate digital embodiment for performing the weighting function $F_2$ is disclosed in FIG. 5 as neuron 80 including weight memory 82 coupled for receiving the 3-bit address word $A_i$ applied at address bus 84 and providing an 8-bit digital weight value $W_i$ at the first input of subtracter 86 in response to the address word $A_i$. Weight memory 82 includes a predetermined number of 8-bit memory locations, $W_1$–$W_8$, and may be implemented as RAM, ROM, EPROM, EEPROM or any other suitable digital memory device. Weights $W_i$ are written into weight memory 82 in a conventional manner through input bus 88. The second input of subtracter 86 is coupled for receiving a digital input signal $I_i$ applied at input bus 90, whereby the difference signal $\Delta_i = I_i - W_i$ is formed at the output of subtracter circuit 86 and applied at the first input of 16-to-8 multiplexer 92. The 8-bit difference signal of subtracter 86 is also complemented through inverter 94 and applied to the second input of multiplexer 92, while the control input of multiplexer 92 is coupled for receiving the sign bit of the difference signal of subtracter 86. The output signal of multiplexer 92 is accumulated with the sign bit of the difference signal in accumulator 96 for providing the output signal of neuron 80 at output 98.

The digital embodiment of FIG. 5 performs a twos complement absolute value combination of the digital input signal series $I_1$–$I_8$ with weights $W_1$–$W_8$ yielding a 16-bit value $V_{98}$ in accumulator 98 as follows:

$$V_{98} = |I_1 - W_1| + |I_2 - W_2| + |I_3 - W_3| + |I_4 - W_4| + |I_5 - W_5| + |I_6 - W_6| + |I_7 - W_7| + |I_8 - W_8| \quad (6)$$

For one computation series according to equation (6), accumulator 96 is zeroed after which a first 8-bit digital input signal, $I_1$, is applied at the second input of subtracter 86 via input bus 90, while an address word, $A_1$, is applied at the address input of weight memory 82 by way of address bus 84. The value of address word $A_1$ retrieves the 8-bit weight $W_1$ from weight memory 82 and applies the same to the first input of subtracter 86. The difference signal $\Delta_1$ and its complement $\overline{\Delta}_1$ are applied at the first and second inputs of multiplexer 92, respectively, while the sign bit of the difference signal $\Delta_1$ is applied to the control input of the same. If the sign bit is logic one indicating that the difference signal is negative, the complemented difference signal $\overline{\Delta}_1$ is passed through multiplexer 92 yielding a positive value at the output thereof by inverting the negative signal. If the sign bit is logic zero, the difference signal $\Delta_1$ is selected. Hence, multiplexer 92 performs an absolute value on the difference signal in accordance with function $F_2$ of FIG. 3. The output signal of multiplexer 92 is summed in accumulator 96 with the sign bit of the difference signal for providing a carry-in to the least significant bit of the accumulation.

A second digital input signal, $I_2$, is applied at the second input of subtracter 86 as a second address word, $A_2$, retrieves weight $W_2$ and applies the 8-bit value thereof to the first input of subtracter 86. The sign bit of the difference signal $\Delta_2 = I_2 - W_2$ again selects either the difference signal $\Delta_2$ or its complement $\bar{\Delta}_2$ for providing an absolute value at the output of multiplexer 92 for accumulating with the sign bit and the prior contents of accumulator 96. The sign bit provides a carry-in to the least significant bit of the accumulation. The process continues for third, fourth, fifth, sixth, seventh and eighth combination of digital input signals $I_3$-$I_8$ and weights $W_3$-$W_8$ according to equation (6) leaving the 16-bit value $V_{98}$ as the output signal of neuron 80 in accumulator 96.

Figure 6:
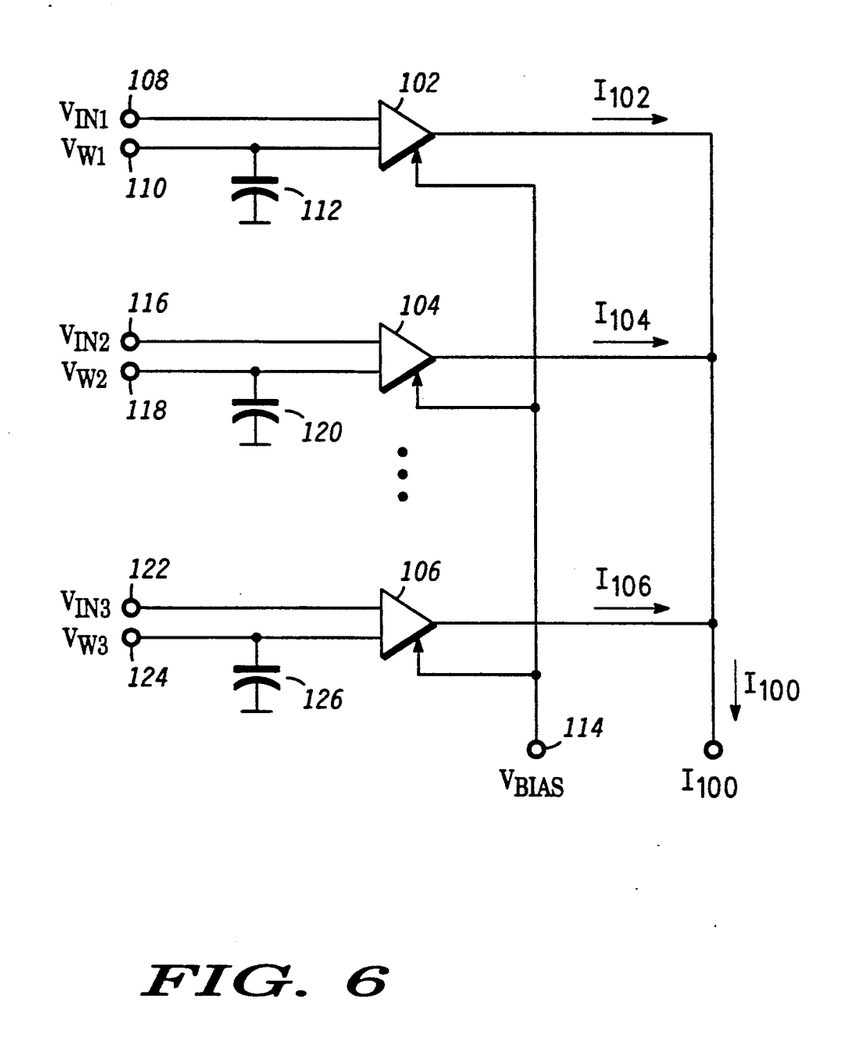
FIG. 6 is a simplified block diagram illustrating an analog embodiment of the present invention.

Turning to FIG. 6, there is shown an analog embodiment of the present invention as neuron 100 including comparators 102, 104 and 106 for providing the absolute value of the difference between respective elements of the input signal vector and the weight signals and summing the results in a parallel manner. Thus, the analog embodiment of FIG. 6 is analogous to the digital embodiment of FIG. 5. Accordingly, the first input of absolute value comparator 102 is coupled for receiving input signal $V_{IN1}$ applied at input 108 and the second input of absolute value comparator 102 is responsive to weight signal $V_{W1}$ applied at input 110 and stored across capacitor 112. Another technique of supplying the weight signal to absolute value comparator 102 may involve storing the weight value in a digital EEPROM and converting the digital output signal thereof via a digital-to-analog converter (not shown) to an appropriate analog signal. Thus, it is understood that the source of the analog weight signal may take a variety of forms. The output signal of absolute value comparator 102 is current $I_{102}$ which is approximately proportional to the absolute value of the difference between input signal $V_{IN1}$ and weight signal $V_{W1}$. The proportionality is determined by the bias signal $V_{BIAS}$ applied through input 114 to absolute value comparators 102-106. Likewise, the first input of absolute value comparator 104 is coupled for receiving input signal $V_{IN2}$ applied at input 116 while the second input of the same is coupled for receiving weight signal $V_{W2}$ applied at input 118 and stored across capacitor 120. The output signal of absolute value comparator 104 is current $I_{104}$ approximately proportional to the absolute value of the difference between input signal $V_{IN2}$ and weight signal $V_{W2}$. The first input of absolute value comparator 106 is coupled for receiving input signal $V_{IN3}$ applied at input 122 and the second input is coupled for receiving weight signal $V_{W3}$ applied at input 124 and stored across capacitor 126. The output signal of absolute value comparator 106 is current $I_{106}$ approximately proportional to the absolute value of the difference between input signal $V_{IN3}$ and weight signal $V_{W3}$. The output signal of neuron 100 is approximately equal to the sum of currents $I_{102} + I_{104} + I_{106}$ and may be described as follows:

$$I_{100} = I_{BIAS} \left\{ \left[ \tanh\left(\frac{K|V_{IN1} - V_{W1}|}{2}\right)\right] + \left[\tanh\left(\frac{K|V_{IN2} - V_{W2}|}{2}\right)\right] + \left[\tanh\left(\frac{K|V_{IN3} - V_{W3}|}{2}\right)\right] + \left[\tanh\left(\frac{K|V_{IN4} - V_{W4}|}{2}\right)\right]\right\} \quad (7)$$

where:
tanh () is the hyperbolic tangent function
K is a lumped constant related to Boltzmann's constant with units of volts$^{-1}$ More generally, the output signal of neuron 100 is presented in Equation (8) where the integer n is the number of elements of the input signal vector.

$$I_{100} = I_{BIAS} \sum_{i=1}^{n} \left[\tanh\left(\frac{K|V_{INi} - V_{Wi}|}{2}\right)\right] \quad (8)$$

Figure 7:
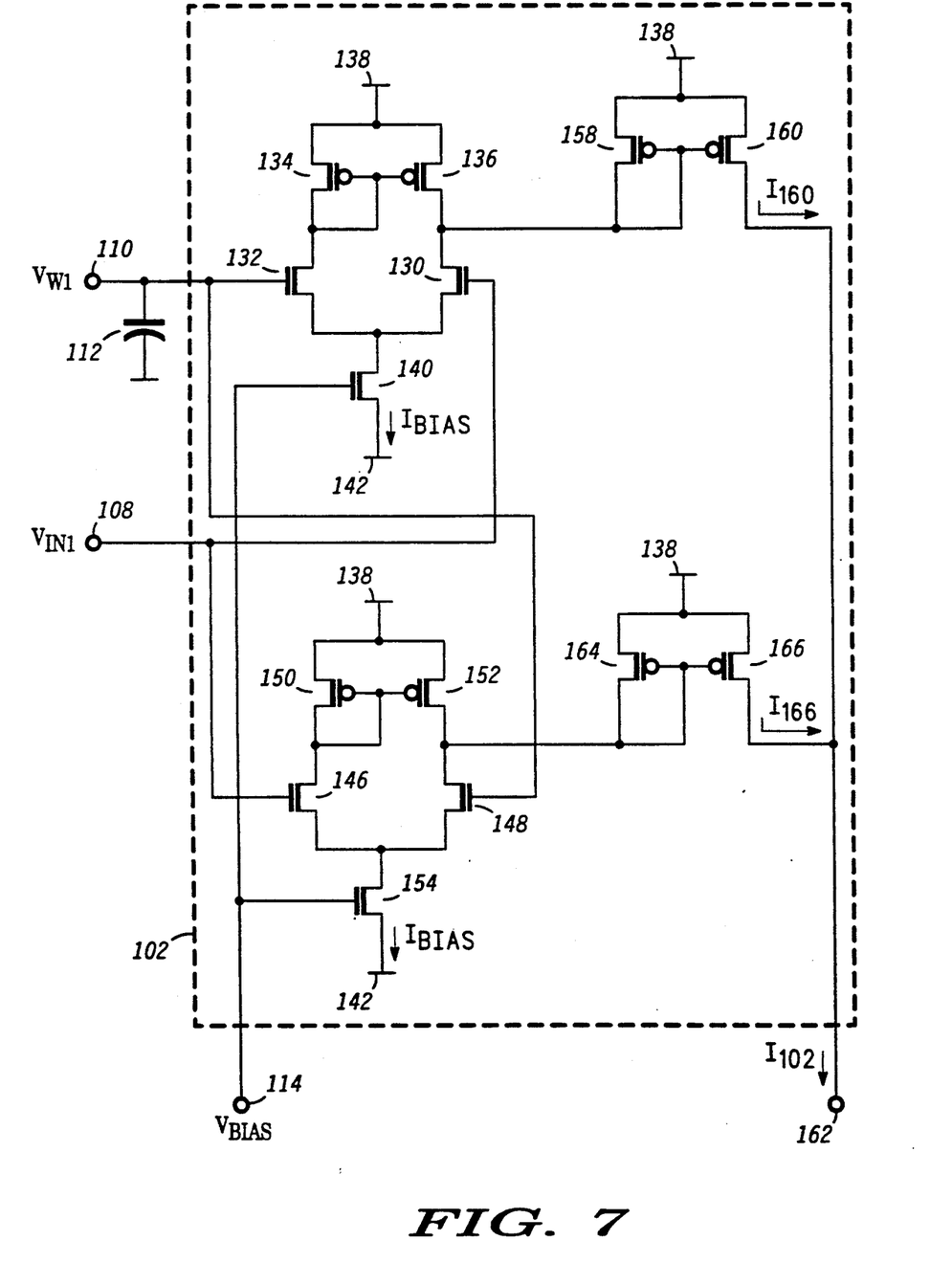
FIG. 7 is a schematic diagram illustrating further detail of an absolute value comparator.

A more detailed description of absolute value comparator 102 is shown in FIG. 7 where components having a similar function are assigned the same reference numbers used in FIG. 6. Absolute value comparators 104 and 106 follow a similar construction as shown for comparator 102. The input signal $V_{IN1}$ is applied at the gate of transistor 130 while the weight signal $V_{W1}$ is applied at the gate of transistor 132. The drains of transistors 132 and 130 are respectively coupled to the input and output of a current mirror formed of transistors 134 and 136. The gates of transistors 134 and 136 are coupled together to the drain of transistor 132, while the sources of the same are coupled to power supply conductor 138 typically operating at a positive potential such as $V_{DD}$. The sources of transistors 130 and 132 are coupled together for sinking a tail current $I_{BIAS}$ through transistor 140 in response to the bias voltage $V_{BIAS}$ applied at the gate of the latter. The source of transistor 140 is coupled to power supply conductor 142 typically operating at ground potential. Thus, transistors 130-140 form a differential amplifier, wherein the input signal $V_{IN1}$ is applied at the inverting input and the weight signal $V_{W1}$ is applied at the non-inverting input thereof.

Continuing with FIG. 7, the input signal $V_{IN1}$ is also applied at the gate of transistor 146 and the weight signal $V_{W1}$ is applied at the gate of transistor 148. The drains of transistors 146 and 148 are respectively coupled to the input and output of a current mirror formed of transistors 150 and 152. The gates of transistors 150 and 152 are coupled together to the drain of transistor 146, while the sources of the same are coupled to power supply conductor 138. The sources of transistors 146 and 148 are coupled together for sinking a tail current $I_{BIAS}$ through transistor 154 in response to the bias voltage $V_{BIAS}$ applied at its gate. The source of transistor 154 is coupled to power supply conductor 142. Transistors 146-154 also form a differential amplifier although the input signal $V_{IN1}$ is now applied at the non-inverting input while the weight signal $V_{W1}$ is applied at its inverting input.

The output signal of the differential amplifier formed of transistors 130-140 is provided at the drain of transistor 130 which is coupled to the input of a current mirror formed of transistors 158 and 160. The gates of transistors 158 and 160 are coupled together to the drain of transistor 130, while the sources are coupled to power supply conductor 138. The output current $I_{160}$ of current mirror circuit 158-160 flows through the output of comparator 102 at output 162. Likewise, the output signal of the differential amplifier formed of transistors 146-154 is provided at the drain of transistor 148 which is coupled to the input of a current mirror formed of transistors 164 and 166. The gates of transistors 164 and 166 are coupled together to the drain of transistor 148, while the sources are coupled to power supply conductor 138. The output current $I_{166}$ of current mirror circuit 164-166 also flows through the output of comparator 102 at output 162 such that current $I_{102}$ is equal the sum of current $I_{160}$ and $I_{166}$.

The operation of the differential amplifier circuits like 130-140 and 146-154 is believed to be well known in the art. Briefly, the output signal of differential amplifier circuit 130-140 becomes more positive as the weight signal $V_{W1}$ exceeds the input signal $V_{IN1}$. Conversely, the output signal of differential amplifier circuit 130-140 becomes more negative as the input signal $V_{IN1}$ exceeds the weight signal $V_{W1}$. The opposite is true for the differential amplifier circuit 146-154, wherein the output signal becomes more negative as the weight signal $V_{W1}$ exceeds the input signal $V_{IN1}$ and more positive as the input signal $V_{IN1}$ exceeds the weight signal $V_{W1}$. The output signals of the differential amplifier circuits are converted to currents through current mirror circuits 158-160 and 164-166 for providing current $I_{102}$ flowing through the output of absolute value comparator 102.

Figure 8:
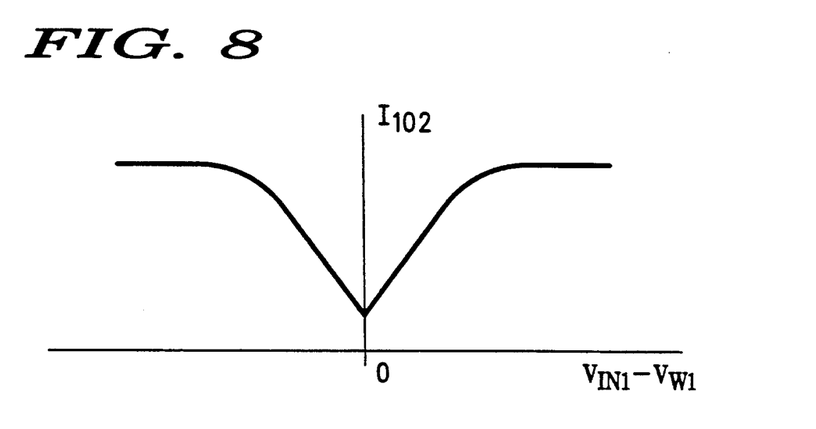
FIG. 8 is a graph use in the explanation of the absolute value comparator.

The relationship is graphically illustrated in FIG. 8, wherein the current $I_{102}$ has a positive value and negative slope when the difference $V_{IN1}-V_{W1}$ is negative and a positive value and positive slope when the difference $V_{IN1}-V_{W1}$ is positive. When the weight signal $V_{W1}$ is more positive than the input signal $V_{IN1}$ (negative difference), transistors 132 and 134 sink the majority of the tail current $I_{BIAS}$ flowing through transistor 140 and reflect the same through transistor 136 thereby increasing the potential at the drain of transistor 130 and disabling current mirror circuit 158-160 such that no current $I_{160}$ flows. At the same time, the more positive weight signal $V_{W1}$ causes transistor 148 to conduct the majority of the tail current $I_{BIAS}$ flowing through transistor 154 such that less current flows into the input of current mirror circuit 150-152. The potential at the drain of transistor 148 falls, enabling current mirror circuit 164-166 for providing positive current $I_{166}$ as current $I_{102}$. Conversely, when the input signal $V_{IN1}$ is more positive than the weight signal $V_{W1}$ (positive difference), transistors 146 and 150 sink the majority of the tail current $I_{BIAS}$ and reflect the same through transistor 152 thereby increasing the potential at the drain of transistor 148 and disabling current mirror circuit 134-136 such that current $I_{166}$ is zero. The less positive weight signal $V_{W1}$ causes transistor 130 to conduct the majority of the tail current $I_{BIAS}$ flowing through transistor 140 whereby less current flows into the input of current mirror circuit 134-136. The potential as the drain of transistor 130 falls enabling current mirror circuit 158-160 which provides positive current $I_{160}$ as current $I_{102}$.

As illustrated in FIG. 8, the output signal of comparator 102 approximates an absolute value function in the linear region of the curve such as function $F_2$ in FIG. 3. Furthermore, it should be appreciated that the simple distance neuron of the present invention may be implemented in either digital or analog form as examples of both embodiments have been demonstrated.

Hence, what has been provided is a novel neuron using a simple distance calculation between the input signal vector and the synapse weight elements for providing an output signal. A difference signal is developed by subtracting a weight signal from an input signal for providing a difference signal which is processed through weighting function having a predetermined polarity and accumulated for providing the output signal of the neuron.

We claim:

1. A circuit for providing an output signal, comprising:
   first means for subtracting a weight signal from an input signal and providing a difference signal;
   second means for applying a weighting function to said difference signal of said first means and providing a weighted output signal having a predetermined polarity; and
   third means for accumulating said weighted output signal of said second means for providing the output signal of the circuit.

2. The circuit of claim 1 wherein said first means includes a subtracter circuit having first and second inputs and an output, said first input being coupled for receiving said input signal, said second input being coupled for receiving said weight signal, said output providing said difference signal.

3. The circuit of claim 2 wherein said second means includes a memory circuit for retrieving an output signal from an addressable location of said memory circuit as determined by said difference signal, said output signal of said memory circuit being weighted according to said weighting function.

4. The circuit of claim 3 wherein said third means includes an accumulator circuit having first and second inputs and an output, said first input being coupled for receiving said output signal of said memory circuit and an output for providing the output signal of the circuit.

5. The circuit of claim 1 wherein said first means includes a plurality of subtracter circuits each having first and second inputs and an output, said first inputs being coupled for receiving a plurality of input signals, said second inputs being coupled for receiving a plurality of weight signals, said outputs providing a plurality of difference signals from respective combinations of ones of said plurality of input signals and ones of said plurality of weight signals.

6. The circuit of claim 5 wherein said second means includes a plurality of inputs coupled for receiving said plurality of difference signals for providing said plurality of weighted output signals each having a predetermined polarity.

7. The circuit of claim 6 wherein said third means includes a plurality of inputs coupled for accumulating said plurality of weighted difference signals for providing the output signal of the circuit.

8. In a neural network a digital processing element, comprising:
   a digital input bus coupled for receiving a digital input signal;
   a digital address bus coupled for receiving a digital address signal;
   first means for storing a plurality of digital weight signals, said first means being coupled to said digital address bus for addressing one of said plurality of digital weight signals according to said digital address signal and loading said one of said plurality of digital weight signals onto an output port;

second means coupled for receiving said digital input signal and said one of said plurality of digital weight signals and providing a difference signal as the difference between said digital input signal and said one of said plurality of digital weight signals;

third means coupled for receiving said difference signal of said second means and applying a weighting function to said difference signal for providing a weighted output signal having a predetermined polarity; and fourth means coupled for receiving said weighted output signal of said third means and accumulating the values thereof.

9. The neural network of claim 8 wherein said digital address signal and said digital input signal change value such that ones of said plurality of digital weight signals are respectively subtracted from ones of said digital input signal in a predetermined manner for providing a plurality of output signals of said second means over time which are processed through said weighting function of said third means and accumulated in said fourth means.

10. The neural network of claim 9 wherein said first means includes a plurality of digital memory locations addressable by said digital address signal and having a common output coupled to said output port of said first means.

11. The neural network of claim 10 wherein said second means includes a subtraction circuit having first and second inputs and an output, said first input being coupled to said digital input bus, said second input being coupled to said output port of said first means for receiving said one of said plurality of digital weight signals, said output providing said difference output signal of said second means as the difference of said digital input signal and said one of said plurality of digital weight signals.

12. The neural network of claim 11 wherein said third means includes a memory circuit for providing said weighted output signal in response to said difference signal processed through said weighting function.

13. The neural network of claim 12 wherein said fourth means includes a accumulation circuit having an input coupled to said output of said memory circuit and having an output for providing the output signal of the digital processing element as the sum total of said weighted output signals of said memory circuit.

14. The neural network of claim 11 wherein said third means includes:

inverter circuit coupled for receiving said difference signal and providing a complement thereof; and a multiplexer circuit having first and second inputs and an output, said first input being coupled for receiving said difference signal, said second input being coupled for receiving said complement of said difference signal, said output providing said weighted output signal in response to said difference signal processed through said weighting function.

15. The neural network of claim 14 wherein said fourth means includes a accumulation circuit having an input coupled to said output of said multiplexer circuit and having an output for providing the output signal of the digital processing element as the sum total of said weighted output signals of said multiplexer circuit.

16. A method of computation for an artifical neuron for providing an output signal, comprising the steps of:

subtracting a weight signal from an input signal for providing a difference signal;

applying a weighting function to said difference signal for providing a weighted output signal having a predetermined polarity; and accumulating the values of said weighted output signal having a predetermined polarity for providing the output signal of the artificial neuron.

17. The method of claim 16 wherein said step of applying said weighting function to said difference signal includes the steps of:

applying said difference signal at the address input of a memory circuit; and retrieving said weighted output signal from said memory circuit according to said difference signal.

18. In a neural network an analog processing element responsive to an input signal vector for providing an output signal, the analog processing element comprising:

first means for providing a plurality of weight signals;

a plurality of comparator circuits each having first and second inputs respectively coupled for receiving an element of the input signal vector and one of said plurality of weight signals and providing an output signal as the absolute value of the difference of said element of the input signal vector and said one of said plurality of weight signals at an output; and second means for summing said output signals of said plurality of comparator circuits and providing the output signal of the analog processing element.

19. The neural network of claim 18 wherein one of said plurality of comparator circuits includes:

first and second transistors each having a gate, a drain and a source, said gate of said first transistor being coupled for receiving said element of the input signal vector, said gate of said second transistor being coupled for receiving said one of said plurality of weight signals, said sources of said first and second transistors being coupled together;

a third transistor having a gate, a drain and a source, said gate being coupled for receiving a bias signal, said source being coupled to a first source of operating potential, said drain being coupled to said sources of said first and second transistors;

a first current mirror circuit having an input coupled to said drain of said second transistor and having an output coupled to said drain of said first transistor; and a second current mirror circuit having an input coupled to said drain of said first transistor and having an output coupled to said output of said one of said plurality of comparators for providing said output signal as the absolute value of the difference of said element of the input signal vector and said one of said plurality of weight signals.

20. The neural network of claim 19 wherein one of said plurality of comparator circuit further includes:

fourth and fifth transistors each having a gate, a drain and a source, said gate of said fourth transistor being coupled for receiving said element of the input signal vector, said gate of said fifth transistor being coupled for receiving said one of said plurality of weight signals, said sources of said fourth and fifth transistors being coupled together;

a sixth transistor having a gate, a drain and a source, said gate being coupled for receiving said bias signal, said source being coupled to said first source of operating potential, said drain being coupled to said sources of said fourth and fifth transistors;

a third current mirror circuit having an input coupled to said drain of said fourth transistor and having an output coupled to said drain of said fifth transistor; and a fourth current mirror circuit having an input coupled to said drain of said fifth transistor and having an output coupled to said output of said one of said plurality of comparators for providing said output signal as the absolute value of the difference of said element of the input signal vector and said one of said plurality of weight signals.

* * * * *